United States Patent
Abel et al.

(10) Patent No.: US 8,328,160 B2
(45) Date of Patent: Dec. 11, 2012

(54) SEALS, BALL VALVE ASSEMBLIES, AND METHODS OF OPERATING BALL VALVE ASSEMBLIES

(75) Inventors: Micah S. Abel, Gilbert, AZ (US); Jeff Scott, Mesa, AZ (US); Don Christensen, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 345 days.

(21) Appl. No.: 12/783,357

(22) Filed: May 19, 2010

(65) Prior Publication Data

US 2011/0284784 A1 Nov. 24, 2011

(51) Int. Cl.
*F16K 5/20* (2006.01)

(52) U.S. Cl. .................... 251/174; 251/180; 251/315.01; 251/314

(58) Field of Classification Search ................. 251/174, 251/180, 315.01, 315.1, 314, 316, 317
See application file for complete search history.

(56) References Cited

U.S. PATENT DOCUMENTS

| | | | | |
|---|---|---|---|---|
| 3,361,430 A | * | 1/1968 | Reid | 277/436 |
| 3,667,727 A | * | 6/1972 | Bowden | 251/172 |
| 4,194,749 A | * | 3/1980 | Bonafous | 251/306 |
| 4,335,748 A | * | 6/1982 | Olansen et al. | 137/614.11 |
| 4,373,543 A | * | 2/1983 | Brown et al. | 137/74 |
| 4,658,847 A | * | 4/1987 | McCrone | 137/72 |
| 5,137,259 A | * | 8/1992 | Stein | 251/174 |
| 5,170,989 A | * | 12/1992 | Kemp | 251/174 |
| 5,178,364 A | * | 1/1993 | Garrigues et al. | 251/306 |
| 5,655,752 A | * | 8/1997 | De Villepoix et al. | 251/359 |
| 5,996,472 A | | 12/1999 | Nguyen et al. | |
| 7,111,821 B2 | * | 9/2006 | Promper | 251/214 |
| 7,243,900 B2 | | 7/2007 | Wang | |

FOREIGN PATENT DOCUMENTS

DE 4143306 A1 10/1992

* cited by examiner

*Primary Examiner* — John Bastianelli
(74) *Attorney, Agent, or Firm* — Ingrassia Fisher & Lorenz, P.C.

(57) ABSTRACT

Seals, ball valve assemblies, and methods of operating ball valves assemblies are provided. The seal includes an annular jacket, a restrictor, and a spring energizer. The annular jacket includes a first annular pocket and a second annular pocket. The restrictor is disposed in the first annular pocket and is capable of restricting shrinkage of the first annular pocket to a predetermined diameter range, if the seal is exposed to a temperature within a predetermined temperature range. The spring energizer is disposed in the second annular pocket and is configured to supply a force against the annular jacket to maintain the seal against a contact surface.

20 Claims, 3 Drawing Sheets

SEALS, BALL VALVE ASSEMBLIES, AND METHODS OF OPERATING BALL VALVE ASSEMBLIES

TECHNICAL FIELD

The inventive subject matter generally relates to seals and more particularly relates to seals for use in ball valves.

BACKGROUND

Cryogenic liquids, such as cryogenic hydrogen, nitrogen, and oxygen, may be employed for a variety of applications. For example, cryogenic liquids may be used as fuel for aircraft or spacecraft engines, such as rocket engines. In other examples, cryogenic liquids are used to cool components of vehicles.

In most applications, cryogenic liquids are typically delivered from a liquid source to a destination via a piping arrangement. To control flow of cryogenic liquids through the piping, one or more ball valves may be included. Ball valves generally include a valve housing, a flange, and a ball. The valve housing can be placed between two pipes in the piping arrangement; alternatively, the valve housing may be disposed in an interior of a pipe. The flange couples to and defines a valve chamber with the valve housing. The ball is disposed in the valve housing and extends from a stem that is configured to rotate relative to the valve housing. As a result, the ball also rotates within the valve chamber. Typically, the ball includes a bore so that when the ball rotates to a first position, the bore provides a path for the cryogenic liquid to travel from one portion of the valve chamber to another. When the ball rotates to a second position, the opening is blocked and the cryogenic liquid is prevented from traveling through the valve chamber.

To reduce leakage within the ball valve, a seal may be disposed between the flange and the ball. Generally, the ball may comprise aluminum or another metallic material. For improved contact with the ball, the seal can be formed of a polymer material. Because the seal and ball materials have differing thermal expansion properties, they may expand at different rates as the ball valve is exposed to various temperature environments. As a result, a load provided by the metallic ball against the polymer seal may not provide a desired amount of contact or force when the ball valve is exposed to an initial temperature and then subsequently exposed to a lower temperature, such as when disposed in a room temperature environment (e.g., about 22° C.) and subsequently exposed to cryogenic fluids (e.g., fluids having temperatures less than about −150° C.). Even when the ball valve is exposed to temperatures higher than those of cryogenic fluids, the load of the ball against the seal may be excessive and unwanted friction may be produced between the ball and the seal. Accordingly, use of the ball valve may be limited to environments within a certain temperature range.

Hence, it is desirable to have an improved ball valve that provides desired sealing and load capabilities over a wide range of temperatures. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

The inventive subject matter will hereinafter be described in conjunction with the following drawing figures, wherein like numerals denote like elements, and Seals, ball valve assemblies, and methods of operating ball valves assemblies are provided.

In an embodiment, by way of example only, a seal includes an annular jacket, a restrictor, and a spring energizer. The annular jacket includes a first annular pocket and a second annular pocket. The restrictor is disposed in the first annular pocket and is capable of restricting shrinkage of the first annular pocket to a predetermined diameter range, if the seal is exposed to a temperature within a predetermined temperature range. The spring energizer is disposed in the second annular pocket and is configured to supply a force against the annular jacket to maintain the seal against a contact surface.

In another embodiment, by way of example only, a ball valve assembly is provided. The ball valve assembly includes a valve housing having an inner surface defining a first portion of a valve chamber, a flange coupled to the valve housing and having an inner surface defining a second portion of the valve chamber, the flange including an annular groove, a ball disposed in the valve chamber and rotationally mounted to the valve housing, the ball having a contact surface, and a seal disposed in the annular groove. The seal includes an annular jacket including a first annular pocket and a second annular pocket, a restrictor disposed in the first annular pocket and capable of restricting shrinkage of the first annular pocket to a predetermined diameter range, if the seal is exposed to a temperature within a predetermined temperature range, and a spring energizer disposed in the second annular pocket and configured to supply a force against the annular jacket to maintain the seal against the contact surface, when the ball valve assembly is in a closed position.

In still another embodiment, a method for operating a ball valve assembly includes rotating a ball of the ball valve assembly to a closed position to seat a contact surface of the ball against a seal, the seal including an annular jacket, a restrictor, and a spring energizer, the annular jacket including a first annular pocket and a second annular pocket, the restrictor disposed in the first annular pocket and capable of restricting shrinkage of the first annular pocket to a predetermined diameter range, if the seal is exposed to a temperature within a predetermined temperature range, and the spring energizer disposed in the second annular pocket and configured to supply a force against the annular jacket to maintain the seal against the contact surface, and rotating the ball to an open position.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

An improved seal has been provided for use in a system for delivery of fluids and/or gases. The improved seal may be employed to deliver cryogenic or other fluids and/or gases having temperatures measurements in a range of about −250° C. to about 95° C. The improved seal includes an annular jacket, a restrictor, and a spring energizer. The annular jacket is formed from a polymer material and has a substantially S-shaped axial cross-section including a first annular pocket and a second annular pocket. The restrictor is disposed in the first annular pocket, and the spring energizer is disposed in the second annular pocket. The improved seal may be implemented into various components in which the seal and adjacent surfaces may have differing thermal expansion properties. For example, the improved seal may be included in valves, such as ball valves.

Figure 1:
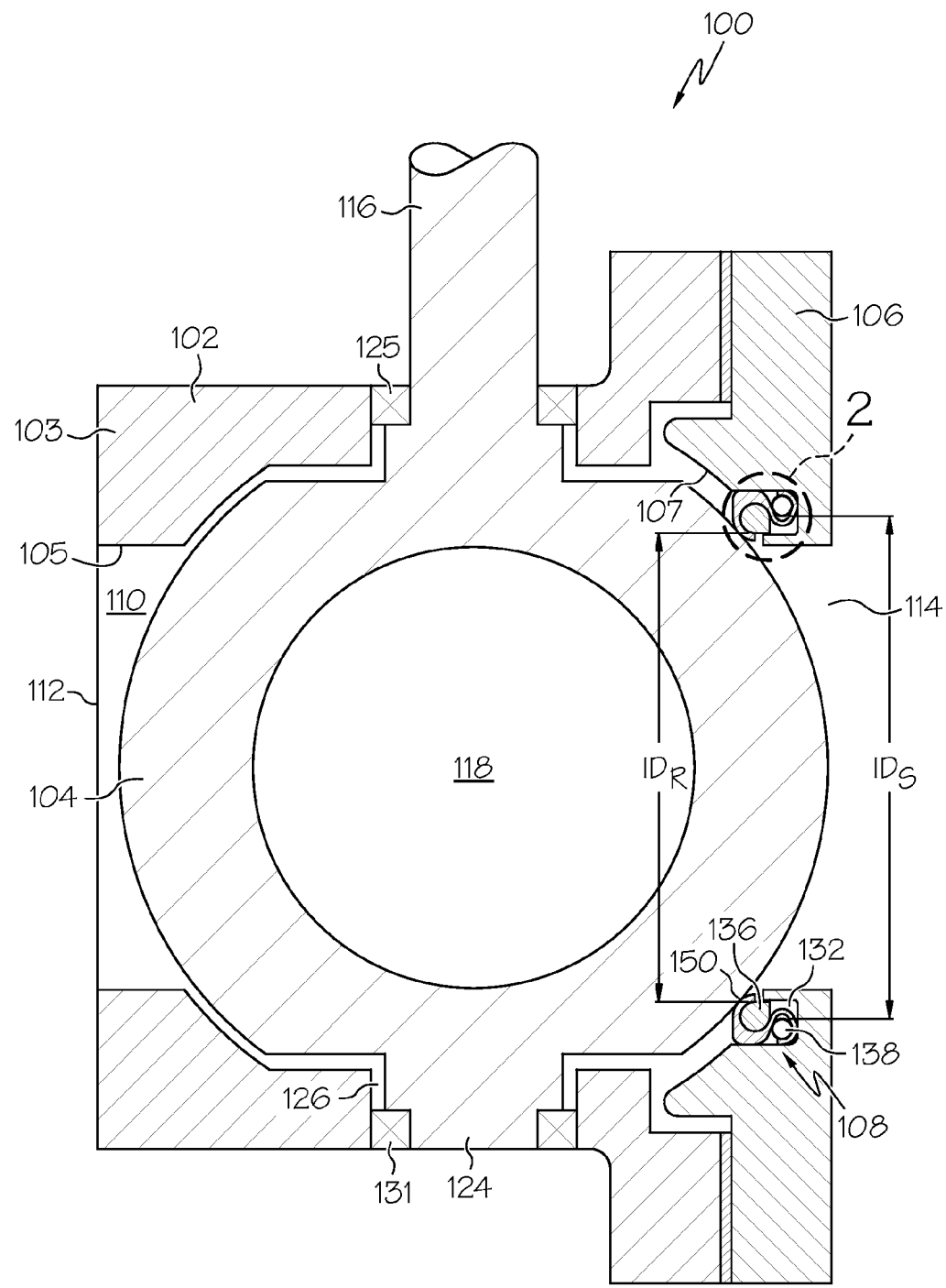
FIG. 1 is a cross-sectional side view of a ball valve in a closed position, according to an embodiment.

FIG. 1 is a cross-sectional side view of a ball valve 100, according to an embodiment. The ball valve 100 includes a valve housing 102, a ball 104, a flange 106, and a seal 108, in an embodiment. According to an embodiment, the valve housing 102 is configured to couple the ball valve 100 between two conduits (not shown) through which fluid or gas may flow. In this regard, the valve housing 102 includes a substantially cylindrical section 103 having an inner surface 105 that defines a portion of a valve chamber 110, in an embodiment. The valve housing 102 is coupled to the flange 106, which includes an inner surface 107 defining another portion of the valve chamber 110. The valve chamber 110 has a first inlet/outlet 112 and a second inlet/outlet 114 providing communication from one end of the ball valve 100 to another. In other embodiments, the valve chamber 110 may include more than one inlet/outlet 112, 114.

The valve chamber 110 is configured to contain the ball 104 and to provide a space within which the ball 104 can rotate. According to an embodiment, the inner surfaces 105, 107 of the valve housing 102 and flange 106 are contoured such that an outer surface of the ball 104 contacts the seal 108. In accordance with an embodiment, the ball 104 may have an outer diameter that is less than a widest dimension of the valve chamber 110. For example, the ball 104 may have a largest diameter in a range of about 1.0 centimeters (cm) to about 45.0 cm, and the valve chamber 110 can have a largest diameter in a range of about 5 cm to about 10 cm. In another embodiment, the ball 104 and/or valve chamber 110 may have larger or smaller largest diameters. In an embodiment, the ball 104 may be substantially centered within the valve chamber 110. In another embodiment, the ball 104 may be off-centered relative to a center of the valve chamber 110.

As alluded to above, the ball 104 is configured to rotate between open and closed positions to control flow through the valve chamber 110. In an embodiment, open positions allow fluid or gases to flow through the valve chamber 110, and closed positions prevent flow through the valve chamber 110. Thus, the ball 104 is rotationally mounted to the valve housing 102. For rotation of the ball 104, a stem 116 extends from the ball 104 and may be coupled to a rotator mechanism (not shown) for rotating the ball 104. Bearings 125 are mounted around a portion of the stem 116 to facilitate rotational movement.

A bore 118 extends through the ball 104 such that when the rotator mechanism (not shown) rotates the ball 104 to the open position, fluid or gas flows through the bore 118. The bore 118 may be sized to allow a desired amount of fluid or gas to flow through the valve chamber 110. In an embodiment, the bore 118 may have a flow area in a range of about 32 cm$^2$ to about 25 cm$^2$. In embodiments in which a lesser or greater flow rate is desired, the bore 118 may be smaller or larger than the aforementioned range. To provide additional support for ball 104 as it is positioned within the valve chamber 110, a stub shaft 124 extends from the ball 104 opposite the stem 116. The stub shaft 124 extends into an opening 126 in the valve housing 102 and is surrounded by a bearing 131 to reduce friction during rotation of the ball 104. Though not shown, the stem 116 and/or rotator mechanism (not shown) may be in operative communication with a controller, which provide commands to the ball valve 100 to open or close.

The flange 106 is plate-shaped and is coupled to the valve housing 102, in an embodiment. According to an embodiment, the flange 106 includes a groove (also referred to as a "seal gland") 132 and an opening providing the inlet/outlet 114. In an embodiment, the flange 106 is attached to the valve housing 102 via fasteners (not shown) located radially outward relative to the groove 132. The inlet/outlet 114 may have a largest diameter in a range of about 10 cm to about 15 cm, in an embodiment. In other embodiments, the largest diameter may be greater or less than the aforementioned range. In accordance with an embodiment, the largest diameter of the inlet/outlet 114 may be substantially equal in size to that of the inlet/outlet 112. In other embodiments, the inlet/outlets 112, 114 may not be equal in size.

In an embodiment, the valve housing 102, the ball 104, and the flange 106 may comprise a metallic-type of material such as aluminum or steel. One or more of the valve housing 102, the ball 104, and/or the flange 106 may comprise substantially similar materials. Alternatively, the valve housing 102, the ball 104, and the flange 106 may comprise different materials. Selection of particular materials may depend on the range of temperatures to which the ball valve assembly 100 is to be exposed.

The seal 108 is disposed in the groove 132 of the flange 106 and is configured to maintain a sufficient load against the ball 104 for the ball valve 100 to meet predetermined leakage requirements when the ball 104 is in the closed position. Specifically, at room temperature (e.g., at a temperature in a range of about 22° C. and about 15° C.), the components of the seal 108 and the ball 104 have particular room temperature geometries. If the seal 108 is exposed to a temperature below room temperature (e.g., if the temperature drops), the geometries of the components of the seal 108 and the ball 104 shrink. However, the rates and amounts of shrinkage of each component of the seal 108 and the ball 104 differ depending on component material, which increases a load applied by the seal 108 on the ball 104. To reduce the load from the seal 108, the seal 108 includes an annular jacket 134, a restrictor 136, and a spring energizer 138, in an embodiment.

Figure 2:
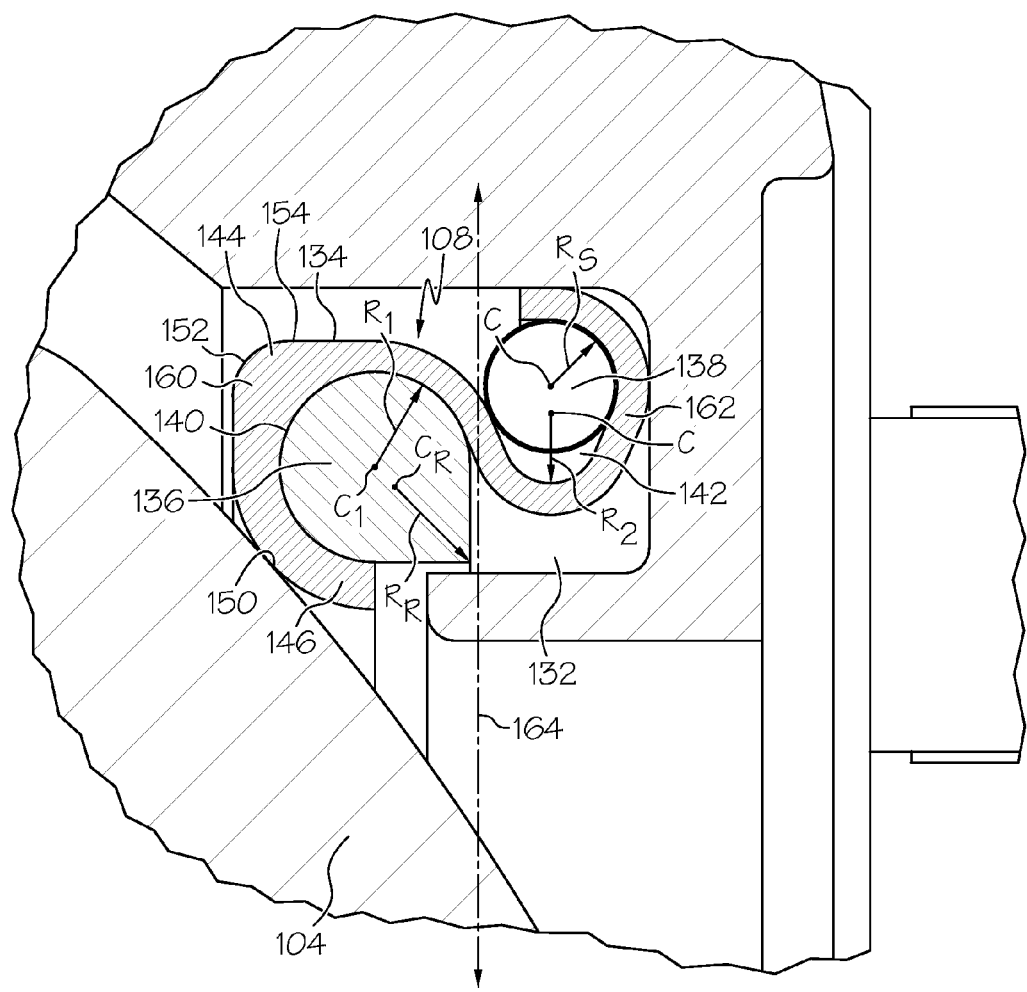
FIG. 2 is a close-up view of a portion of the ball valve of FIG. 1 indicated by dotted circle 2, according to an embodiment.

FIG. 2 is a close-up view of a portion of the ball valve 100 of FIG. 1 indicated by dotted circle 2 including the seal 108 and a portion of the groove 132, according to an embodiment. To affect sealing between a contact surface 150 of the ball 104 and the seal 108, the annular jacket 134 comprises a polymer material. In an example, the polymer material comprises polytetrafluoroethylene (PTFE). In other embodiments, the polymer material may comprise a different material, such as polychlorotrifluoroethylene.

In accordance with an embodiment, the annular jacket 134 and the restrictor 136 cooperate to restrict an amount of shrinkage experienced by the annular jacket 134 to within a predetermined range, if the seal 108 is exposed to a temperature within a predetermined temperature range. For example, the annular jacket 134 may be configured to grow or shrink within the predetermined range of ±0.5 cm, during exposure to temperatures within the predetermined temperature range of from about −250° C. to about 95° C.).

The annular jacket 134 includes a first annular pocket 140 formed in a first section 160 of the annular jacket 134 and a second annular pocket 142 formed in an adjacent, second section 162 of the annular jacket 134. In an embodiment, the annular jacket 134 is configured to have a relatively low spring rate to maintain a spring rate differential relatively low across a relatively wide temperature range. In this regard, the annular jacket 134 is configured to be loaded in a bending configuration rather than in a compressed configuration. By forming the annular jacket 134 such that the first and second annular pockets 140, 142 oppose each other, such a configuration is achieved. Although the annular jacket 134 is depicted as having a double curve shape, other embodiments of the annular jacket 134 may include other configurations.

The restrictor 136 is disposed in the first annular pocket 140. The first section 160 of the annular jacket 134 (the section of the annular jacket 134 closest to the contact surface of the ball 104) is configured to include a closed outer diameter surface 154 so that the annular jacket 134 can constrict around the restrictor 136 when a temperature of the seal 108 is reduced to thereby restrict shrinkage of the seal 108 against the ball 104. To provide sufficient structural integrity to further resist the constriction from the annular jacket 134, the restrictor 136 has an outer surface that is contoured to correspond to a shape of an inner surface defining the first annular pocket 140. Hence, a radius R1 of the first annular pocket 140 of the annular jacket 134 may be substantially equal to (e.g., ±0.05 cm) or less than a radius ($R_R$) of an axial cross section of the restrictor 136. The radius ($R_R$) of an axial cross section of the ring 136 may be measured from a surface of the ring 136 to a centerpoint ($C_R$) of the axial cross section of the ring 136. The centerpoint ($C_R$) of the axial cross section of the ring 136 may coincide with the center C1 of the first annular pocket 140, in an embodiment. In another embodiment, the two may not coincide.

The restrictor 136 has a round radial cross-sectional shape, in an embodiment. In another embodiment, the restrictor 136 has a different radial cross-sectional shape, such as oval, square, rectangle or the like. In an embodiment, the restrictor 136 has a round axial cross-sectional shape, square axial cross-sectional shape or another axial cross-sectional shape.

Although depicted as a single ring in FIGS. 1 and 2, the restrictor 136 can be made up of more than one ring, in another embodiment. For example, the restrictor 136 can include two or more rings disposed within the first annular pocket 140. In still other embodiments, the restrictor 136 can include two or more rings, each disposed in separate annular pockets formed in the annular jacket 134. The restrictor 136 is configured such that it includes at least one continuous ring, in an embodiment. In another embodiment, the restrictor 136 can have a ring-shape, but the restrictor 136 may not be a continuous ring.

The restrictor 136 comprises material selected to provide the seal 108 with a consistent contact point with the ball 104 across a wide temperature range (e.g. from about −250° C. to about 95° C.). In this regard, the restrictor 136 is made from a first material having a coefficient of thermal expansion that is less than a coefficient of thermal expansion of the polymer material of the annular jacket 134. In another embodiment, the restrictor 136 is made from a first material having a coefficient of thermal expansion that is substantially similar to that of the ball 104 and/or the valve housing 102. For example, the first material of the restrictor 136 may include, but is not limited to, a metal or metal alloy, such as steel, aluminum or another metal. The restrictor 136 may be solid, in an embodiment. In another embodiment, the restrictor 136 may be hollow.

The spring energizer 138 is disposed in the second annular pocket 142 of the annular jacket 134, which is positioned in contact with the flange 106. The spring energizer 138 and annular jacket 134 cooperate such that the spring energizer 138 supplies a force against the annular jacket 134 to provide a seal with the contact surface of the ball 104, when the ball valve 100 is in a closed position. The spring energizer 138 is configured to provide a consistent spring rate over a wide temperature range (e.g. from about −250° C. to about 95° C.). In this regard, a desired spring constant of the spring energizer 138 is selected to cooperate with a spring rate of the annular jacket 134 to thereby provide a consistent and relatively low effective seal spring rate. In an embodiment, the spring constant may be in a range of about 2,000 pounds per inch to about 10,000 pounds per inch. In another embodiment, the spring constant of the spring energizer 138 is greater or less than the aforementioned range.

Although the spring energizer 138 is shown as being made up of a single spring disposed in the second annular pocket 142, the spring energizer 138 may include two or more springs disposed in the second annular pocket 142. In another embodiment, the spring energizer 138 may include two or more springs disposed in a corresponding number of annular pockets 142 formed in the annular jacket 134. The spring energizer 138 comprises a spiral spring formed into an annular shape, in an embodiment. In another embodiment, the spring energizer 138 comprises a different type of device capable of imparting spring-like qualities, such as a serpentine spring.

In an embodiment, the spring energizer 138 is made from material including, but not limited to, a metal or metal alloy, such as steel, aluminum or another metal. In another embodiment, the spring energizer 138 and the restrictor 136 may comprise substantially the same material. In other embodiments, the spring energizer 138 and the restrictor 136 may comprise different materials.

In an embodiment, an inner diameter ($ID_S$) of the spring energizer 138 is larger than an inner diameter ($ID_R$) of the restrictor 136. In other embodiments, the inner diameter of the spring energizer 138 is smaller that that of the restrictor 136. In still another embodiment, an axial cross-sectional radius R2 of the second section 142 of the annular jacket 134 may be slightly greater than a radius ($R_S$) of an axial cross section of the spring energizer 138, as depicted FIG. 2, and the annular jacket 134 may surround the spring energizer 138 without forming a tight fit with the spring energizer 138. The radius ($R_S$) of an axial cross section of the spring energizer 138 may be measured from a surface of the spring energizer 138 to a centerpoint ($C_s$) of the spring energizer 138. In the aforementioned embodiment, the spring energizer 138 is allowed to expand and contract within the groove 132 while being maintained axially in position within the groove 132 without being constricted radially by the annular jacket 134. Hence, as the spring energizer 138 expands, the dimensions of the second annular pocket 142 of the annular jacket 134 correspondingly increase as well. In another embodiment, the spring energizer 138 has an outer surface that is contoured to correspond to a shape of the second annular pocket 142.

Although the annular jacket 134 has an axial cross section resembling an opposing double curve configuration in FIGS. 1 and 2, the annular jacket 134 may have a different axial cross section shape in other embodiments. For example, the first and second annular pockets 140, 142 each open toward a radial axis 164 extending from a center of the annular jacket 134 through a location between the first and second sections 160, 162 to provide relative ease in installing the restrictor 136 and the spring energizer 138. In another embodiment, one or both of the first and second pockets 140, 142 may be closed and the annular jacket 134 may completely surround one or both of the restrictor 136 and/or the spring energizer 138. In another embodiment, the first and second annular pockets 140, 142 may be formed such that the first annular pocket 140 opens toward the radial axis 164, while the second annular pocket 142 opens away from the radial axis 164. Although the first section 160 does not appear to have as curved of an outer surface 152 as that of the second section 162, other embodiments may have a first section outer surface that is more curved than that of the second section 162. Moreover, although the second section 162 of the annular jacket 134 appears to have a circular axial cross section shape, the axial cross section shape may different in other embodiments, such as a U-shape, V-shape or another shape.

The wall thickness (T) of the annular jacket 134 is selected to provide structural integrity and may be scaled thicker or thinner depending on an axial cross-sectional thickness of the restrictor 136 and/or or spring energizer 138. According to another embodiment, one or both of the wall thicknesses of the first section 160 and the second section 162 may vary. In an example, as shown in FIG. 2, a midsection 144 of the first section 160 may be thicker than an end 146 of the first section 160. In another embodiment, the wall thickness of one or both of the sections 160, 162 may be substantially uniform. In accordance with an embodiment, the wall thickness of the first section 160 may be greater than that of the second section 162, as shown in FIG. 2. In another embodiment, the wall thickness of the first section 160 may be less than that of the second section 162.

The seal 108 may be pre-assembled before incorporation into the ball valve 100. For example, the annular jacket 134 may be pre-machined and/or formed from the polymer material mentioned above, the restrictor 136 may be machined from the metallic material to appropriate dimensions, and the spring energizer 138 may be wound to exhibit a particular spring constant. Alternatively, one or both of the restrictor 136 and spring energizer 138 may be obtained as off-the-shelf components. The restrictor 136 and the spring energizer 138 are inserted into the first and second annular pockets 140, 142 of the annular jacket 134, respectively, and the seal is installed into the annular groove 132 in the flange 106. In an embodiment, the stem 116 of the ball 104 is positioned within the valve housing 102 and maintained therein via the rotator mechanism, and the flange 106 is coupled to the valve housing 102. According to an embodiment, to supply an appropriate load against the ball 104, a shim is placed between the housing 102 and gland 106 to alter the position of the seal 108 to the ball 104 to thereby increase or decrease the compression of the seal 108 on the ball 104. The rotator mechanism may be operatively coupled to the controller (not shown).

Figure 3:
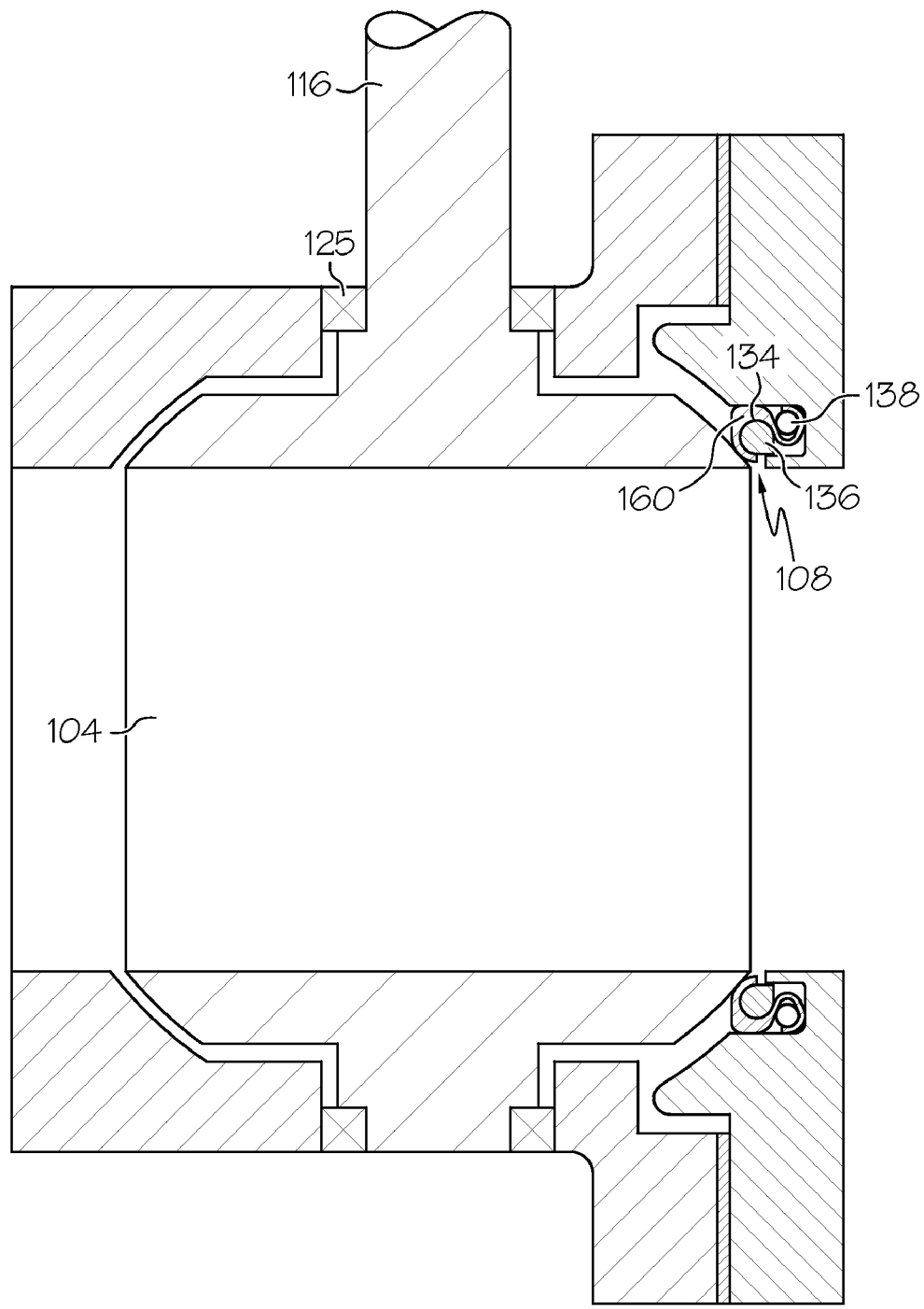
FIG. 3 is a cross-sectional side view of the ball valve of FIG. 1 in an open position, according to an embodiment.

During operation, the ball valve 100 may receive commands from the controller to move to an open or a closed position. FIG. 3 is a cross-sectional side view of the ball valve 100 of FIG. 1 in an open position, according to an embodiment. When the controller commands the ball valve 100 to open, the rotator mechanism (not shown) rotates the ball 104 so that the bore 118 (FIG. 1) is aligned with the valve chamber 110 to thereby allow fluid or gas to flow through the ball valve 100. While in the open position, the ball 104 does not contact the seal 108 and thus, the annular jacket 134 is in an expanded configuration. Even when in the expanded configuration, the restrictor 136 maintains the shape of the first section 160 of the annular jacket 134.

Turning to FIG. 2, when the controller commands the ball valve 100 to close, the rotator mechanism rotates the ball 104 so that the contact surface 150 on the ball 104 seats against the seal 108. In particular, an outer surface of the first section 160 abuts the contact surface 150. Because the restrictor 136 is formed from a material having a thermal expansion rate similar to that of the ball 104, the inner diameter of the restrictor 136 ($ID_R$) correspondingly grows or shrinks as dimensions of the ball 104 grow or shrink. The annular jacket 134, formed from the polymer material, continues to seal against the ball 104 and likewise grows or shrinks with the restrictor 136. The spring energizer 138 supplies a force against the annular jacket 134 to energize the annular jacket 134 and force it to stay in contact with the seating surface 150.

By including the restrictor 136 and the spring energizer 138 in the annular jacket 134, an improved seal is provided against the ball 104. Moreover, although the annular jacket 134 and the ball 104 are formed from materials having different thermal expansion rates, the load provided against the ball 104 by the seal 108 is maintained over wide temperature ranges because transient changes in temperature and thermal gradients are compensated for through incorporating the restrictor 136 and the spring energizer 138 into the annular pockets 140, 142 of the annular jacket 134.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A seal comprising:
   an annular jacket including a first annular pocket and a second annular pocket;
   a restrictor disposed in the first annular pocket and capable of restricting shrinkage of the first annular pocket to a predetermined diameter range, if the seal is exposed to a temperature within a predetermined temperature range; and
   a spring energizer disposed in the second annular pocket and configured to supply a force against the annular jacket to maintain the seal against a contact surface;
   wherein the restrictor comprises a first material and the annular jacket comprises a second material, wherein the first material has a coefficient of thermal expansion that is less than the second material; and
   wherein the restrictor has an outer surface that is contoured to correspond to a shape of an inner surface defining the first annular pocket, and wherein a radius of the restrictor and a radius of the first annular pocket are substantially equal, such that when the seal is exposed to a reduced temperature, the restrictor prevents the first annular pocket from shrinking to a greater extent than the restrictor.

2. The seal of claim 1, wherein:
   the annular jacket comprises a polymer material.

3. The seal of claim 2, wherein:
   the restrictor comprises a metal.

4. The seal of claim 2, wherein:
   the spring energizer comprises a metal.

5. The seal of claim 1, wherein:
   the first annular pocket is formed in a first section of the annular jacket; and the second annular pocket is formed in a second section of the annular jacket adjacent to the first section of the annular jacket.

6. The seal of claim 1, wherein:
the annular jacket has an axial cross section having an opposing double curve shape.

7. The seal of claim 1, wherein:
the first annular pocket opens toward a radial axis extending from a center of the annular jacket through a location between the first annular pocket and the second annular pocket; and
the second annular pocket opens away from the radial axis.

8. The seal of claim 1, wherein:
the first annular pocket opens toward a radial axis extending from a center of the annular jacket through a location between the first annular pocket and the second annular pocket; and
the second annular pocket opens toward the radial axis.

9. The seal of claim 1, wherein:
the restrictor comprises a continuous ring.

10. A ball valve assembly comprising:
a valve housing having an inner surface defining a first portion of a valve chamber;
a flange coupled to the valve housing and having an inner surface defining a second portion of the valve chamber, the flange including an annular groove;
a ball disposed in the valve chamber and rotationally mounted to the valve housing, the ball having a contact surface; and
a seal disposed in the annular groove, the seal comprising:
an annular jacket including a first annular pocket and a second annular pocket;
a restrictor disposed in the first annular pocket and capable of restricting shrinkage of the first annular pocket to a predetermined diameter range, if the seal is exposed to a temperature within a predetermined temperature range; and
a spring energizer disposed in the second annular pocket and configured to supply a force against the annular jacket to maintain the seal against the contact surface, when the ball valve assembly is in a closed position;
wherein the first annular pocket is disposed in the annular groove in an orientation such that it is adjacent to the ball;
wherein the restrictor comprises a first material and the annular jacket comprises a second material, wherein the first material has a coefficient of thermal expansion that is less than the second material; and
wherein the restrictor has an outer surface that is contoured to correspond to a shape of an inner surface defining the first annular pocket, and wherein a radius of the restrictor and a radius of the first annular pocket are substantially equal, such that when the seal is exposed to a reduced temperature, the restrictor prevents the first annular pocket from shrinking to a greater extent than the restrictor.

11. The ball valve assembly of claim 10, wherein:
the annular jacket comprises a polymer material.

12. The ball valve assembly of claim 11, wherein:
the restrictor comprises a metal.

13. The ball valve assembly of claim 12, wherein:
the spring energizer comprises a metal.

14. The ball valve assembly of claim 10, wherein:
the first annular pocket is formed in a first section of the annular jacket; and
the second annular pocket is formed in a second section of the annular jacket adjacent to the first section of the annular jacket.

15. The ball valve assembly of claim 10, wherein:
the annular jacket has an axial cross section having an opposed double curve shape.

16. The ball valve assembly of claim 10, wherein:
the first annular pocket opens toward a radial axis extending from a center of the annular jacket through a location between the first annular pocket and the second annular pocket; and
the second annular pocket opens away from the radial axis.

17. The ball valve assembly of claim 10, wherein:
the first annular pocket opens toward a radial axis extending from a center of the annular jacket through a location between the first annular pocket and the second annular pocket; and
the second annular pocket opens toward the radial axis.

18. A method of operating a ball valve assembly, the method comprising the steps of:
rotating a ball of the ball valve assembly to a closed position to seat a contact surface of the ball against a seal, the seal including an annular jacket, a restrictor, and a spring energizer, the annular jacket including a first annular pocket and a second annular pocket, the restrictor disposed in the first annular pocket and capable of restricting shrinkage of the first annular pocket to a predetermined diameter range, if the seal is exposed to a temperature within a predetermined temperature range, and the spring energizer disposed in the second annular pocket and configured to supply a force against the annular jacket to maintain the seal against the contact surface; wherein the restrictor comprises a first material and the annular jacket comprises a second material, wherein the first material has a coefficient of thermal expansion that is less than the second material; and wherein the restrictor has an outer surface that is contoured to correspond to a shape of an inner surface defining the first annular pocket, and wherein a radius of the restrictor and a radius of the first annular pocket are substantially equal, such that when the seal is exposed to a reduced temperature, the restrictor prevents the first annular pocket from shrinking to a greater extent than the restrictor; and
rotating the ball to an open position.

19. The method of claim 18, wherein:
the first annular pocket opens toward a center of the annular jacket; and
the second annular pocket opens away from the center of the annular jacket.

20. The seal of claim 1, wherein:
the spring energizer is configured to provide a consistent spring rate over a temperature range of about −250 degrees C. to about 95 degrees C.; and
an expansion of the spring energizer causes an expansion in dimensions of the second annular pocket such that the second annular pocket does not restrict the expansion of the spring energizer, and the second annular pocket is allowed to expand within the annular groove so as to allow for unrestricted expansion of the spring energizer.

* * * * *